United States Patent
Makki et al.

(10) Patent No.: US 10,868,641 B2
(45) Date of Patent: Dec. 15, 2020

(54) HYBRID AUTOMATIC REPEAT REQUEST USING AN ADAPTIVE MULTIPLE ACCESS SCHEME

(71) Applicant: Telefonaktiebolaget LM Ericsson (Publ), Stockholm (SE)

(72) Inventors: Behrooz Makki, Gothenburg (SE); Ali Behravan, Stockholm (SE); Mona Hashemi, Ottawa (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 413 days.

(21) Appl. No.: 15/760,827

(22) PCT Filed: Feb. 14, 2018

(86) PCT No.: PCT/EP2018/053633
§ 371 (c)(1),
(2) Date: Mar. 16, 2018

(87) PCT Pub. No.: WO2019/158192
PCT Pub. Date: Aug. 22, 2019

(65) Prior Publication Data
US 2020/0244407 A1 Jul. 30, 2020

(51) Int. Cl.
*H04L 1/18* (2006.01)

(52) U.S. Cl.
CPC .......... *H04L 1/1825* (2013.01); *H04L 1/1864* (2013.01); *H04L 1/1887* (2013.01); *H04L 1/1893* (2013.01)

(58) Field of Classification Search
CPC ... H04L 1/1825; H04L 1/1893; H04L 1/1864; H04L 1/1887
See application file for complete search history.

(56) References Cited

U.S. PATENT DOCUMENTS

| | | |
|---|---|---|
| 2009/0241002 A1 | 9/2009 | Ko et al. |
| 2015/0312074 A1 | 10/2015 | Zhu et al. |
| 2016/0219529 A1* | 7/2016 | Benjebbour .......... H04L 5/0091 |
| 2017/0338915 A1 | 11/2017 | Kim et al. |
| 2018/0048433 A1* | 2/2018 | Martin .................. H04L 1/1887 |

(Continued)

FOREIGN PATENT DOCUMENTS

WO 2017/192070 A1 11/2017

OTHER PUBLICATIONS

3rd Generation Partnership Project; Technical Specification Group Radio Access Network; Study on Network-Assisted Interference Cancellation and Suppression (NAIC) for LTE (Release 12). 3GPP TR 36.866 v12.0.1 (Mar. 2014), 64 pages.

(Continued)

*Primary Examiner* — Thai Nguyen
(74) *Attorney, Agent, or Firm* — Sage Patent Group

(57) ABSTRACT

Embodiments disclosed herein provide an adaptive multiple access scheme. In some embodiments, a UE transmits a message according to a first multiple access scheme and retransmits the message according to a second multiple access scheme. In some embodiments, an access point (AP) receives a message transmitted by the UE according to the first multiple access scheme and receives the message retransmitted by the UE according to the second multiple access scheme.

20 Claims, 14 Drawing Sheets

(56) References Cited

U.S. PATENT DOCUMENTS

2019/0245664 A1* 8/2019 Kim ................. H04L 5/0021

OTHER PUBLICATIONS

3rd Generation Partnership Project; Technical Specification Group Radio Access Network; Study on Downlink Multiuser Superposition Transmission (MUST) for LTE (Release 13). 3GPP TR 36.859 v13.0.0 (Dec. 2015), 48 pages.
3GPP TSG RAN WG1 Meeting #86: Goteborg, Sweden, Aug. 22-26, 2016; Final Report of 3GPP TSG RAN WG1 #85 v1.0.0; 170 pages.
Xu, P. et al., "NOMA: An Information Theoretic Perspective," arXiv:1504.07751v2 [cs.IT] (May 12, 2015), 6 pages.
International Search Report and Written Opinion dated Oct. 12, 2018 issued in International Application No. PCT/EP2018/053633. (15 pages).

* cited by examiner

HYBRID AUTOMATIC REPEAT REQUEST USING AN ADAPTIVE MULTIPLE ACCESS SCHEME

CROSS REFERENCE TO RELATED APPLICATION(S)

This application is a 35 U.S.C. § 371 National Stage of International Patent Application No. PCT/EP2018/053633, filed Feb. 14, 2018, designating the United States, the disclosure of which is incorporated by reference.

TECHNICAL FIELD

Disclosed are embodiments related to an adaptive multiple access scheme utilizing orthogonal multiple access (OMA) and non-orthogonal multiple access (NOMA).

BACKGROUND

The design of multiple access schemes is of interest in the design of cellular telecommunication systems. The goal of multiple access schemes is to provide multiple user equipments (UEs) (i.e., wireless communication devices, such as, for example, smartphones, tablets, phablets, smart sensors, wireless Internet-of-Things (IoT) devices, etc., that are capable of wirelessly communicating with an access point) with radio resources in a spectrum, cost, and complexity-efficient manner. In 1G-3G wireless communication systems, frequency division multiple access (FDMA), time division multiple access (TDMA) and frequency division multiple access (CDMA) schemes have been introduced. Long-Term Evolution (LTE) and LTE-Advanced employ orthogonal frequency division multiple access (OFDMA) and single-carrier (SC)-FDMA as orthogonal multiple access (OMA) schemes. Such orthogonal multiple access schemes have the benefit that there is no mutual interference among UEs, leading to high system performance with simple receivers.

Recently, non-orthogonal multiple access (NOMA) has received considerable attention as a promising multiple access technique for LTE and 5G systems. With NOMA, two or more UEs may share the same radio resources (e.g., time resources, frequency resources, and/or code resources). Particularly, 3GPP has considered NOMA in different applications. For instance, NOMA has been introduced as an extension of the network-assisted interference cancellation and suppression (NAICS) for intercell interference (ICI) mitigation in LTE Release 12 as well as a study item of LTE Release 13, under the name of "Downlink multiuser superposition transmission." Also, in recent 3GPP meetings, it is decided that new radio (NR) should target to support (at least) uplink NOMA, in addition to the OMA approach.

SUMMARY

Using NOMA outperforms OMA in terms of sum rate and is optimal for achieving the maximum capacity region. The performance gain of using NOMA, however, comes at the cost of receiver complexity and delay. Particularly, using NOMA implies implementing complex receivers. Furthermore, using NOMA may lead to extra delays where, for instance, in order to decode a message of a UE having the poorest channel condition, there may be a need to first decode messages of all other paired UEs. As a result, the end-to-end transmission delay increases for UEs (e.g., cell-edge UEs) using NOMA. Thus, whether or not to use NOMA depends on the tradeoff between the improved performance gain and the cost of receiver complexity and/or delay.

Embodiments disclosed herein provide an adaptive hybrid automatic repeat request (HARM)-based method to improve network reliability and fairness. In some embodiments, UEs may switch between a NOMA scheme and a conventional OMA scheme depending on the UEs' message decoding status. While conventional OMA schemes such as time-division multiple access (TDMA) or frequency-division multiple access (FDMA) support UEs with good channel quality with low implementation complexity, NOMA schemes boost achievable rates for UEs in poor channel conditions at the cost of implementation complexity. In some embodiments, message transmit timing and message receive timing may be adapted according to the selected multiple access scheme. While the current disclosure describes a setup with two UEs, the embodiments disclosed herein may be adapted to scenarios with an arbitrary number of UEs.

In one particular aspect there is provided a method performed by a user equipment (UE) for transmitting messages. The method includes the UE transmitting a message according to a first multiple access scheme. The method also includes the UE retransmitting the message according to a second multiple access scheme. In some embodiments, transmitting the message according to the first multiple access scheme comprises transmitting the message during a first time slot. In some embodiments, retransmitting the message according to the second multiple access scheme comprises using a first set of frequencies to transmit the message during a second time slot and using a second set of frequencies to transmit the message during the second time slot.

In some embodiments, the method further includes the UE receiving a negative acknowledgement (NACK) transmitted by an access point (AP) the NACK indicating that the AP was unable to decode the message. In such embodiments, the method includes the UE retransmitting the message according to the second multiple access scheme after receiving the NACK. In some embodiments, the NACK comprises an indication indicating that the second multiple access scheme should be one of: an OMA scheme and a NOMA scheme.

In some embodiments, the method further includes the UE receiving a first index indicating the first set of frequencies and a second index indicating the second set of frequencies. In some embodiments, the method further includes the UE receiving synchronization information before retransmitting the message. In such embodiments, the method includes the UE using the synchronization information to determine a time at which to perform the step of retransmitting the message.

In some embodiments, the first multiple access scheme is an OMA scheme and the second multiple access scheme is a NOMA scheme.

In one particular aspect there is provided a method performed by an access point (AP). The method includes the AP receiving a message transmitted by a UE according to a first multiple access scheme. The method also includes the AP receiving the message retransmitted by the UE according to a second multiple access scheme. In some embodiments, receiving the message transmitted by the UE according to the first multiple access scheme comprises receiving the message during a first time slot.

In some embodiments, the method further includes the AP transmitting a negative acknowledgement (NACK) to the UE, the NACK indicating that the AP was unable to decode the message. In such embodiments, the method includes the AP receiving the message retransmitted by the UE according to the second multiple access scheme after transmitting the NACK. In some embodiments, the NACK comprises an indication indicating that the second multiple access scheme should be one of: an OMA scheme and a NOMA scheme.

In some embodiments, the method further includes the AP transmitting synchronization information after receiving the message transmitted by the UE according to the first multiple access scheme. In such embodiments, the UE is configured to use the synchronization information to determine a time at which to perform the step of retransmitting the message.

In some embodiments, the method further includes the AP transmitting a first index indicating a first set of frequencies and a second index indicating a second set of frequencies. In some embodiments, the method also includes using the first set of frequencies to receive the message during the second time slot and using the second set of frequencies to receive the message during the second time slot. In such embodiments, the method includes storing a first copy of the message received during the first time slot, storing a second copy of the message received using the first set of frequencies during the second time slot, and storing a third copy of the message received using the second set of frequencies during the second time slot. In some embodiments, the method also includes the decoding the message based on a combination of at least one or more of the stored first, second, and third copy of the message.

In some embodiments, the first multiple access scheme is an OMA scheme and the second multiple access scheme is a NOMA scheme.

Advantages that flow from this disclosure include exploiting the network/frequency diversity and increasing achievable rates for UEs using the adaptive multiple access scheme compared to conventional OMA schemes. The disclosed embodiments provide additional advantages including: (1) satisfying the tradeoff between receiver complexity and network reliability, (2) improving service availability and/or network reliability significantly compared to the conventional OMA-based systems, (3) improving fairness between UEs, and (4) being useful in buffer-limited systems.

BRIEF DESCRIPTION OF THE DRAWINGS

The accompanying drawings, which are incorporated herein and form part of the specification, illustrate various embodiments.

DETAILED DESCRIPTION

Figure 1:
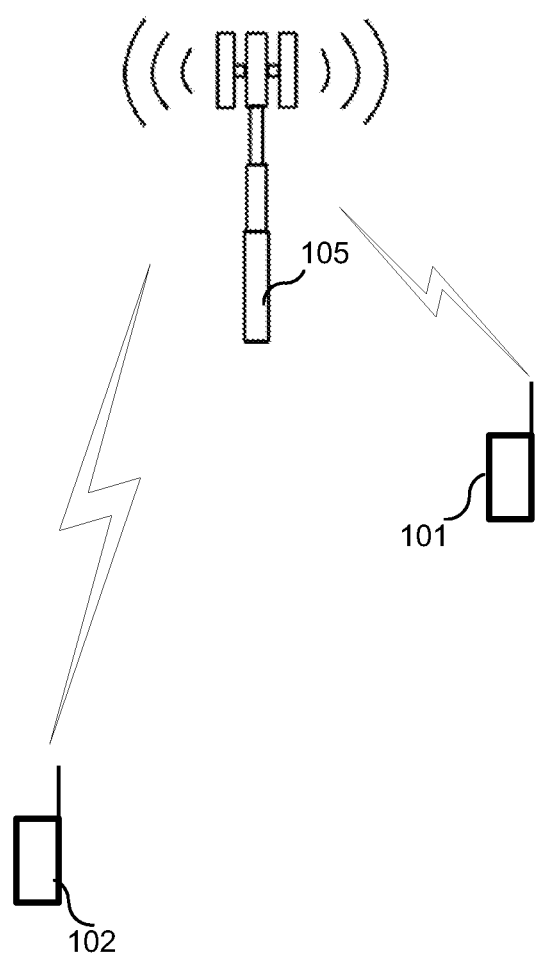
FIG. 1 illustrates an access point serving two UEs.

FIG. 1 illustrates a network 100 having an access point (AP) 105 (e.g., a 4G or 5G base station or other access point) serving two UEs: UE 101 and UE 102. In this scenario, the two UEs 101, 102 connect to the AP 105. With OMA, the UEs signals are transmitted in orthogonal resources, for instance at the same time but in different frequency bands, and the AP 105 decodes the signals separately. With NOMA, on the other hand, the UEs share the same frequency (or "spectrum"), time resources, and code or spreading resources, if any, to send their messages simultaneously. In such a NOMA scenario, the AP 105 can utilize different receivers to decode the UEs' signals. In some embodiments, the AP 105 uses a successive interference cancellation (SIC) receiver to first decode the message of a first UE 101, considering the signal of a second UE 102 as noise. Then, after successfully decoding UE 101's message, the AP 105 subtracts UE 101's signal from the received signal and decodes UE 102's message with no interference from UE 101.

Theoretically, it has been proven that NOMA outperforms OMA in terms of sum rate and is optimal for achieving the maximum capacity region. The performance gain of using NOMA, however, comes at the cost of synchronization and decoding complexity and/or delay. Accordingly, there is a need to utilize NOMA only when it is required. The disclosed embodiments address such a need in the consideration of an HARQ protocol with an adaptive multiple access scheme.

Figure 2:
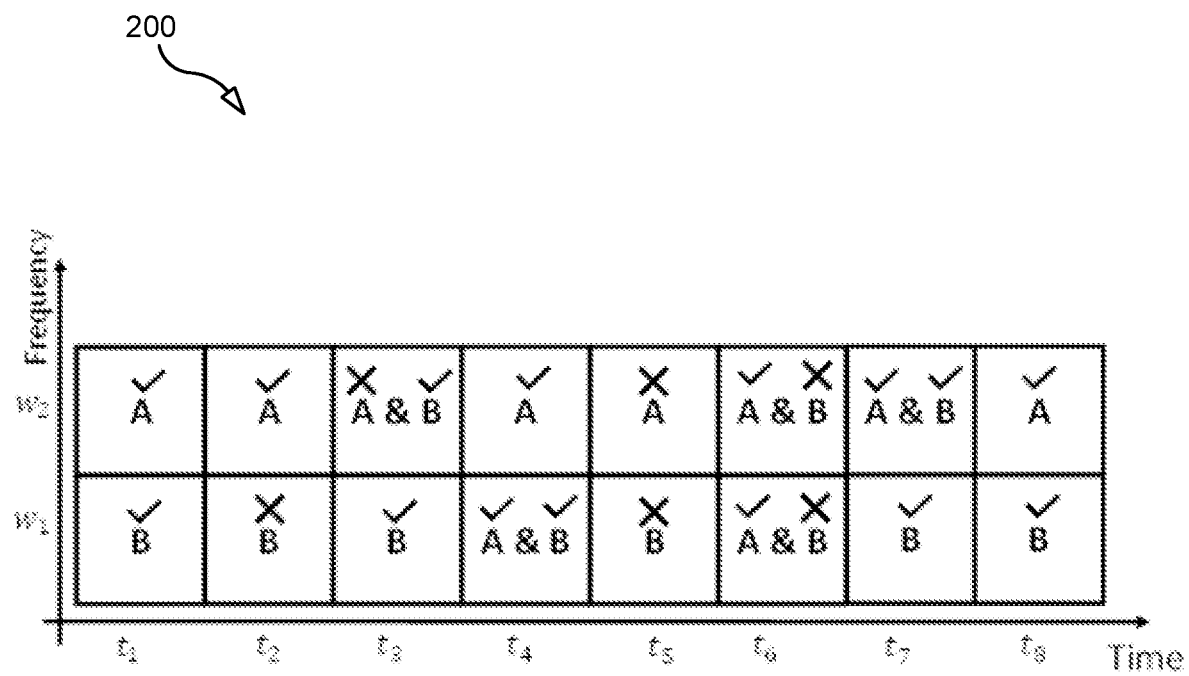
FIG. 2 illustrates a schematic of an adaptive multiple access scheme according to one embodiment.

FIG. 2 illustrates a schematic 200 of an adaptive multiple access scheme according to one embodiment. As shown in FIG. 2, a check-mark indicates that a message transmitted by a UE has been successfully decoded by the AP 105 in a time slot and a x-mark indicates that a message transmitted by the UE has been unsuccessfully decoded by the AP 105 in a time slot. According to some embodiments, if a message transmitted by a UE is not successfully decoded in a time slot, the UE is configured to use the entire frequency bandwidth according to a NOMA scheme in a retransmission of the message.

In some embodiments, a $UE_A$ (also referred to as UE 101) and a $UE_B$ (also referred to as UE 102) each start data transmission in a dedicated a set of frequencies (also referred to as a bandwidth). If a message transmitted by either the $UE_A$ or the $UE_B$ is not correctly decoded by the AP 105 in a time slot, the $UE_A$ or the $UE_B$ may additionally use the set of frequencies allocated to the other UE in the following retransmission of the message. For the purpose of explanation in relation to FIG. 2, a resource block available at a time slot $t_i$ and a set of frequencies $w_j$ is indicated as $B(t_i,$ $w_j$). While the disclosed embodiments describe the chase combining HARQ protocol, also referred to as the repetition time diversity (RTD) HARQ protocol, this is not required and different types of HARQ protocols can be implemented in alternative embodiments. In chase combining HARQ protocol, the same signal (possibly scaled in power) is sent to the receiver in each retransmission round and the receiver decodes the message based on all accumulated signals.

Referring now to time slot $t_2$ in FIG. 2, a message transmitted by the $UE_B$ is not correctly decoded by the AP 105 while a message transmitted by the $UE_A$ is successfully decoded. In some embodiments, the $UE_B$ uses both the $UE_A$ set of frequencies $w_2$ and the $UE_B$ set of frequencies $w_1$ to retransmit the $UE_B$ message in the following time slot $t_3$. On the other hand, $UE_A$ uses just the $UE_A$ set of frequencies $w_2$ to send a new message in time slot $t_3$. In such embodiments, the $UE_B$ transmits the same signal in $B(t_3, w_1)$ and $B(t_3, w_2)$ as the signal previously transmitted in $B(t_2, w_1)$ and the AP 105 decodes the message based on a combination of one or more of the three copies of the signal using the chase combining HARQ protocol. For example, a method for decoding the message comprises the AP 105 first using the SIC receiver to decode the $UE_A$ message received in $B(t_3, w_2)$. The AP 105 then removes the decoded message $UE_A$ message from the received signal in $B(t_3, w_2)$ and uses maximum ratio combining (MRC) of the three copies of the $UE_B$ message to decode the $UE_B$ message. In some embodiments, even if the $UE_A$ message is not correctly decoded in slot $t_3$, the AP 105 can still perform the MRC of the three copies of the $UE_B$ message, i.e. two interference-free copies and one interference-affected copy, to decode the $UE_B$ message.

The adaptive multiple access scheme may be adapted, in some embodiments, using the following procedure:

Step 1

$UE_A$ and $UE_B$ each transmit a message according to OMA.

Step 2

For each message, the AP 105 sends an acknowledgement/negative acknowledgement (ACK/NACK) signal. In some embodiments, the AP 105 sends a NACK signal to the $UE_B$ in response to a message transmitted by the $UE_B$ during a first time slot. In such embodiments, $UE_B$ may be configured to retransmit the $UE_B$ message according to a NOMA scheme during a second time slot after the first time slot. Accordingly, the $UE_B$ may retransmit the $UE_B$ message during the second time slot in a first set of frequencies allocated to the $UE_B$ and a second set of frequencies allocated to the $UE_A$. In some embodiments, the AP 105 transmits index information indicating the set of frequencies allocated to each UE (e.g., the first set of frequencies and the second set of frequencies). In some embodiments, one or more sets of frequencies for retransmitting a message may be pre-configured for the UEs. In some embodiments, the AP 105 is configured to send synchronization signals comprising synchronization information to the UEs for use when transmitting and/or retransmitting messages according to the NOMA scheme. Accordingly, $UE_B$ may use the synchronization information such that the timing for retransmitting the $UE_B$ message according to the NOMA scheme is synchronized with the $UE_A$'s timing of transmitting and/or retransmitting a message during the second time slot. In some embodiments, the AP 105 may transmit an indication to the $UE_B$ indicating whether NOMA or OMA should be used for retransmitting the message.

In some embodiments, messages transmitted according to the OMA scheme and messages transmitted according to the NOMA scheme during a time slot may cause differing message decoding delays in the AP 105 which affect the ACK/NACK feedback timing.

The adaptive multiple access scheme described in the disclosed embodiments provides considerable reduction in the UEs error probability because 1) the achievable rates of the UEs are increased with the selective implementation of the NOMA scheme and 2) the exploitation of frequency diversity which is of great help in HARQ protocols.

The adaptive multiple access scheme described in the disclosed embodiments is useful in buffer-limited systems because, for instance, referring back to slot $t_3$ of FIG. 2, the AP 105 receives three copies of the $UE_B$ message in two time slots ($t_2$ and $t_3$).

The adaptive multiple access scheme described in the disclosed embodiments significantly improves fairness between the UEs because, for instance, the adaptive multiple access scheme provides a high probability for a UE having poor long-term channel conditions (e.g. a cell-edge UE) to use all available sets of frequencies in each time slot.

In some embodiments, the adaptive multiple access scheme may be adapted using the following procedure. In step 1, the UEs may transmit a message according to the NOMA scheme. For example, $UE_A$ may use shared resources (e.g., a common set of frequencies in a same time slot) with $UE_B$ in a transmission according to the NOMA scheme. In step 2, if the message transmissions in step 1 are not successful, the UEs may retransmit the messages according to the OMA scheme. For example, $UE_A$ may retransmit the $UE_A$ message in a dedicated resource (e.g., a set of frequencies allocated to the $UE_A$).

In some embodiments, the adaptive multiple access scheme may be adapted using the following procedure. In step 1, $UE_A$ and $UE_B$ may transmit a message according to the NOMA scheme. In step 2, if the message transmissions in step 1 are not successful, $UE_A$ and $UE_B$ retransmit each respective message according to the NOMA scheme, where the $UE_A$ and/or the $UE_B$ retransmits the respective message with a different spreading signature. In some embodiments, the UEs may randomly select the different spreading signature. In some embodiments, the different spreading signature may be configured by the AP 105. This embodiment of the adaptive multiple access scheme addresses possible errors in detection that may occur due to the closeness of some spreading signature sequences (e.g., closeness in terms of Hamming distance) used in the NOMA scheme. The retransmission of the messages by $UE_A$ and $UE_B$ provided by this embodiment of the adaptive multiple access scheme may result in lower correlation between spreading of the respective retransmitted messages, and therefore a higher chance of detection by the AP 105.

In some embodiments, the adaptive multiple access scheme described in any of the disclosed embodiments may be used in a repetition scenario. Repetition refers to retransmission without an ACK/NACK feedback, where the UE repeats each transmission multiple times to guarantee reception. In LTE and NR, repetition is used for UEs having low coverage channels. In some embodiments, slot aggregation and/or TTI bundling may be used instead of repetition for UEs having low coverage channels.

Figure 3:
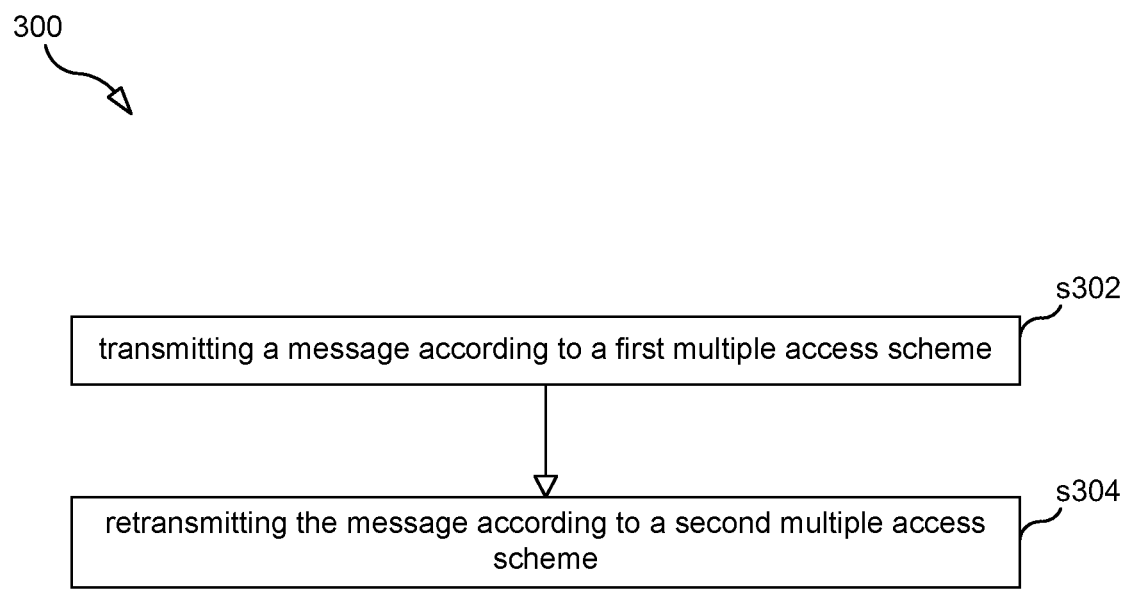
FIG. 3 is a flow chart illustrating a process according to one embodiment.

FIG. 3 is a flow chart illustrating a process 300, according to some embodiments, that is performed by a UE 102 for transmitting messages. As shown in FIG. 3, process 300 may begin in step s302 in which the UE 102 transmits a message according to a first multiple access scheme. In step s304, the UE 102 retransmits the message according to a second multiple access scheme.

In some embodiments, the process 300 includes an additional step in which the UE 102 receives a negative acknowledgement, NACK, transmitted by the AP 105, the NACK indicating that the AP 105 was unable to decode the message. In such embodiments, the process 300 includes a further step in which the UE 102 retransmits the message according to the second multiple access scheme after receiving the NACK. In some embodiments, the NACK may include an indication indicating that the second multiple access scheme should be one of: an OMA scheme and a NOMA scheme.

In some embodiments, the first multiple access scheme is an OMA scheme and the second multiple access scheme is a NOMA scheme.

In some embodiments, transmitting the message according to the first multiple access scheme may include transmitting the message during a first time slot. In some embodiments, retransmitting the message according to the second multiple access scheme may include: using a first set of frequencies to transmit the message during a second time slot and using a second set of frequencies to transmit the message during the second time slot.

In some embodiments, the process 300 may include an additional step in which the UE 102 receives a first index indicating the first set of frequencies and a second index indicating the second set of frequencies.

In some embodiments, the process 300 may include an additional step in which the UE 102 receives synchronization information before retransmitting the message. In such embodiments, the UE 102 uses the synchronization information to determine a time at which to perform the step of retransmitting the message.

Figure 4:
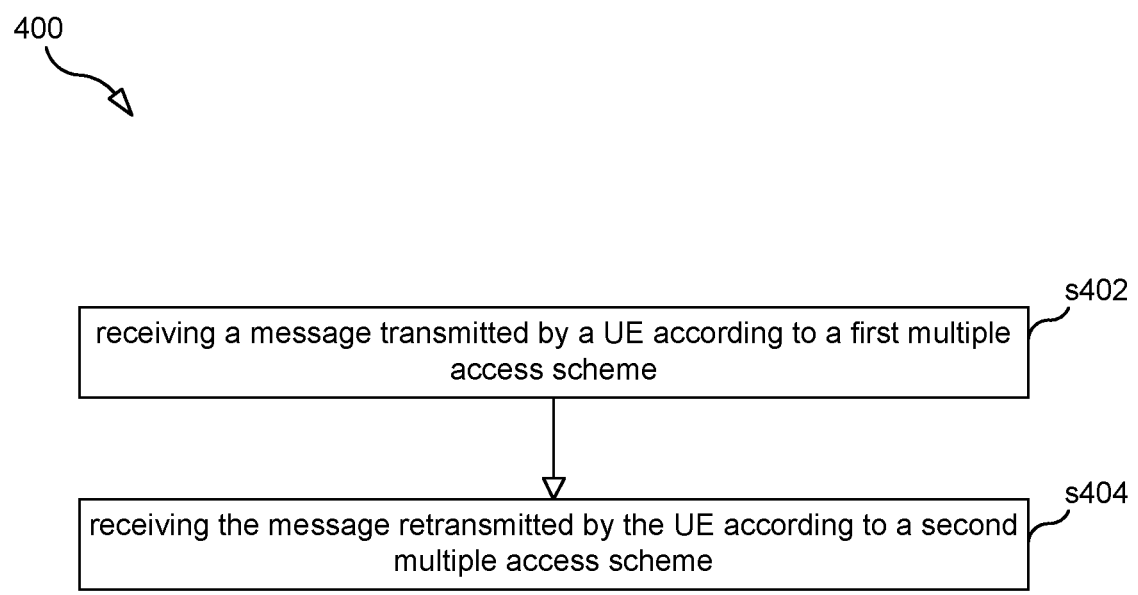
FIG. 4 is a flow chart illustrating a process according to one embodiment.

FIG. 4 is a flow chart illustrating a process 400, according to some embodiments, that is performed by a AP 105. As shown in FIG. 4, process 400 may begin in step s402 in which AP 105 receives a message transmitted by a UE 102 according to a first multiple access scheme. In step s404, the AP 105 receives the message retransmitted by the UE 102 according to a second multiple access scheme.

In some embodiments, the process 400 includes an additional step in which the AP 105 transmits a negative acknowledgement, NACK, to the UE 102, the NACK indicating that the AP 105 was unable to decode the message. In such embodiments, the process 400 includes a further step in which the AP 105 receives the message retransmitted by the UE 102 according to the second multiple access scheme after transmitting the NACK. In some embodiments, the NACK may include an indication indicating that the second multiple access scheme should be one of: an OMA scheme and a NOMA scheme In some embodiments, the first multiple access scheme is an OMA scheme and the second multiple access scheme is a NOMA scheme.

In some embodiments, receiving the message transmitted by the UE 102 according to the first multiple access scheme may include receiving the message during a first time slot.

In some embodiments, the process 400 includes an additional step in which the AP 105 transmits synchronization information after receiving the message transmitted by the UE 102 according to the first multiple access scheme. In some embodiments, the UE 102 is configured to use the synchronization information to determine a time at which to perform the step of retransmitting the message.

In some embodiments, the process 400 includes an additional step in which the AP 105 transmits a first index indicating a first set of frequencies and a second index indicating a second set of frequencies. In some embodiments, receiving the message retransmitted by the UE 102 according to the second multiple access scheme may include: using the first set of frequencies to receive the message during the second time slot and using the second set of frequencies to receive the message during the second time slot.

In some embodiments, the process 400 includes an additional step in which the AP 105, stores a first copy of the message received during the first time slot, a second copy of the message received using the first set of frequencies during the second time slot, and a third copy of the message received using the second set of frequencies during the second time slot.

In some embodiments, the process 400 includes an additional step in which the AP 105 decodes the message based on a combination of at least one or more of the stored first, second, and third copy of the message.

Figure 5:
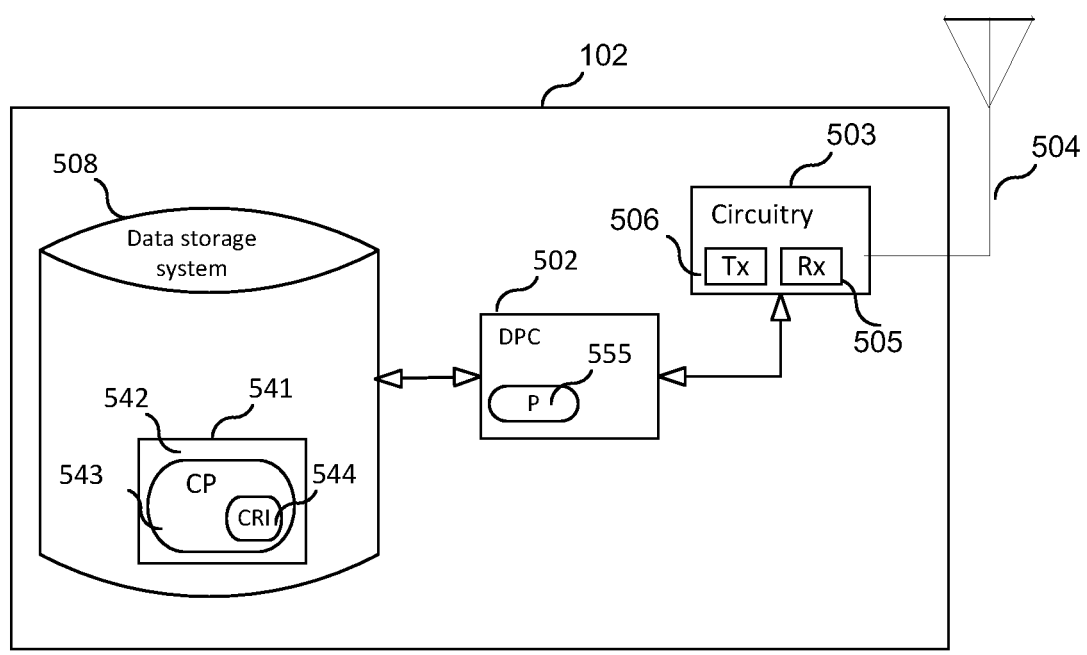
FIG. 5 is a block diagram of a UE according to one embodiment.

FIG. 5 is a block diagram of UE 102 according to some embodiments. As shown in FIG. 5, UE 102 may comprise: data processing circuitry (DPC) 502, which may include one or more processors (P) 555 (e.g., a general purpose microprocessor and/or one or more other processors, such as an application specific integrated circuit (ASIC), field-programmable gate arrays (FPGAs), and the like); circuitry 503 (e.g., radio transceiver circuitry comprising a receiver (Rx) 505 and a transmitter (Tx) 506) coupled to an antenna system 504 for wireless communication with access points and/or other UEs); and local storage unit (a.k.a., "data storage system") 508, which may include one or more non-volatile storage devices and/or one or more volatile storage devices (e.g., random access memory (RAM)). In embodiments where DPC 502 includes a programmable processor, a computer program product (CPP) 541 may be provided. CPP 541 includes a computer readable medium (CRM) 542 storing a computer program (CP) 543 comprising computer readable instructions (CRI) 544. CRM 542 may be a non-transitory computer readable medium, such as, but not limited, to magnetic media (e.g., a hard disk), optical media, memory devices (e.g., random access memory, flash memory), and the like. In some embodiments, the CRI 544 of computer program 543 is configured such that when executed by data processing apparatus 502, the CRI causes UE 102 to perform steps described herein (e.g., steps described herein with reference to the flow charts and/or message flow diagrams). In other embodiments, UE 102 may be configured to perform steps described herein without the need for code. That is, for example, DPC 502 may consist merely of one or more ASICs. Hence, the features of the embodiments described herein may be implemented in hardware and/or software.

Figure 6:
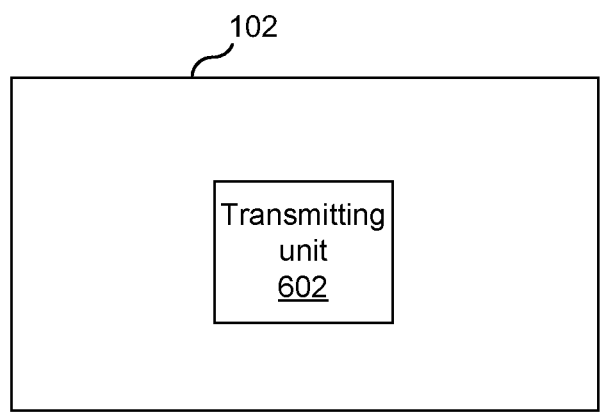
FIG. 6 is a diagram showing functional units of a UE according to one embodiment.

FIG. 6 is a diagram showing functional units of UE 102 according to some embodiments. As shown in FIG. 6, UE 102 includes: a transmitting unit 602 for a message according to a first multiple access scheme and retransmitting the message according to a second multiple access scheme.

Figure 7:
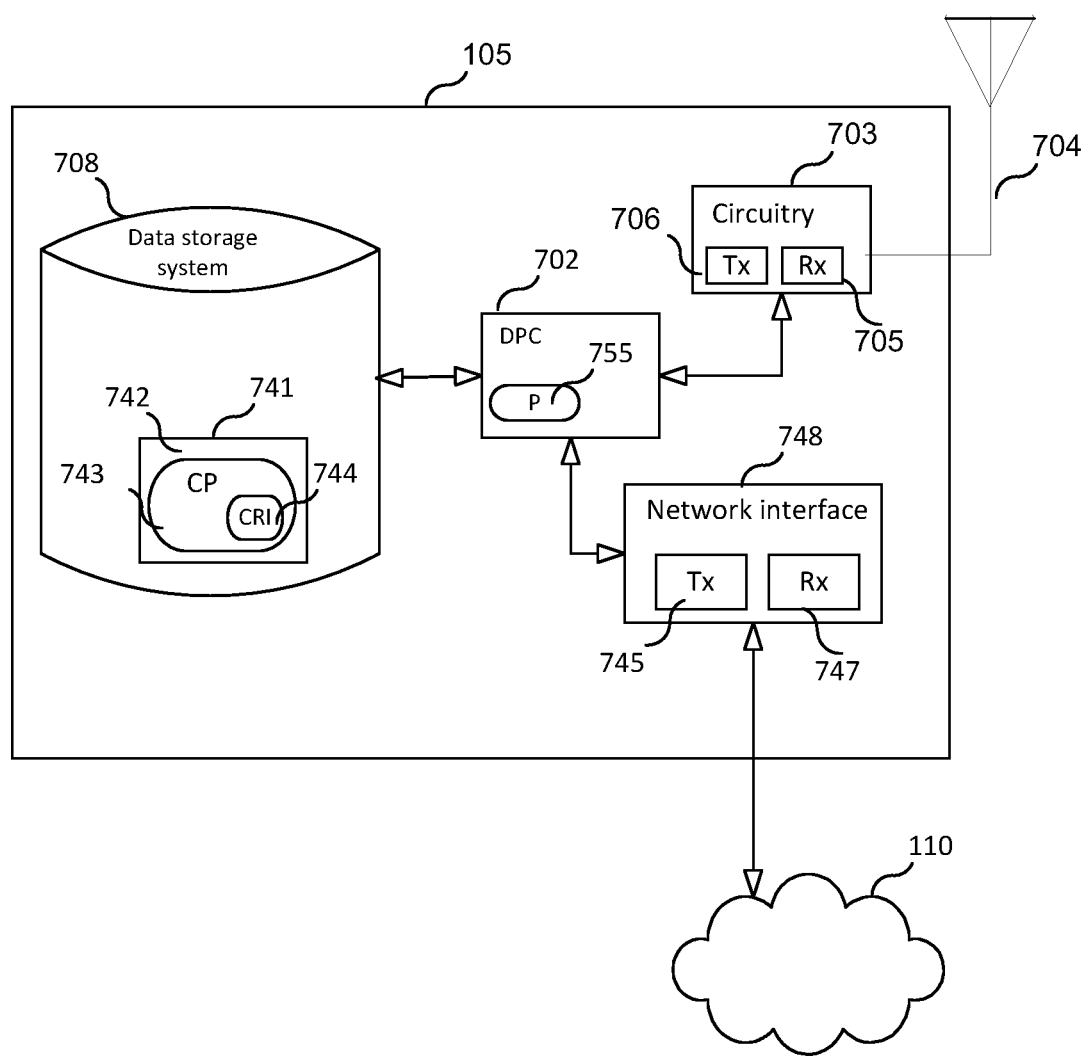
FIG. 7 is a block diagram of an access point according to one embodiment.

FIG. 7 is a block diagram of AP 105 according to some embodiments. As shown in FIG. 7, AP 105 may comprise: data processing circuitry (DPC) 702, which may include one or more processors (P) 755 (e.g., a general purpose microprocessor and/or one or more other processors, such as an application specific integrated circuit (ASIC), field-programmable gate arrays (FPGAs), and the like); a network interface 748 comprising a transmitter (Tx) 745 and a receiver (Rx) 747 for enabling AP 105 to transmit data to and receive data from other nodes connected to a network 110 (e.g., an Internet Protocol (IP) network) to which network interface 748 is connected; circuitry 703 (e.g., radio transceiver circuitry comprising an Rx 705 and a Tx 706) coupled to an antenna system 704 for wireless communication with UEs); and local storage unit (a.k.a., "data storage system") 708, which may include one or more non-volatile storage devices and/or one or more volatile storage devices (e.g., random access memory (RAM)). In embodiments where DPC 702 includes a programmable processor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, but not limited, to magnetic media (e.g., a hard disk), optical media, memory devices (e.g., random access memory, flash memory), and the like. In some embodiments, the CRI 744 of computer program 743 is configured such that when executed by data processing apparatus 702, the CRI causes AP 105 to perform steps described herein (e.g., steps described herein with reference to the flow charts and/or message flow diagrams). In other embodiments, AP 105 may be configured to perform steps described herein without the need for code. That is, for example, DPC 702 may consist merely of one or more ASICs. Hence, the features of the embodiments described herein may be implemented in hardware and/or software.

Figure 8:
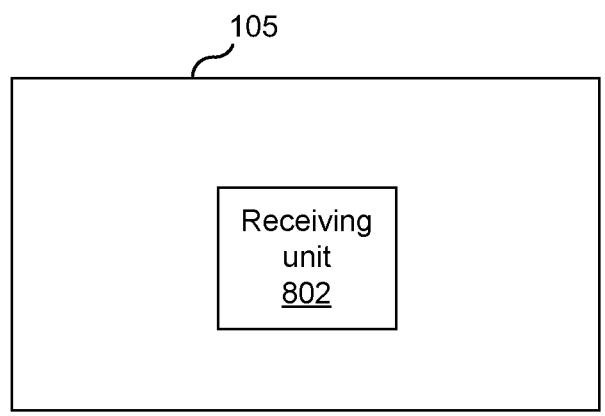
FIG. 8 is a diagram showing functional units of an access point according to one embodiment.

FIG. 8 is a diagram showing functional units of AP 105 according to some embodiments. As shown in FIG. 8, AP 105 includes a receiving unit 802 for receiving a message transmitted by a UE 102 according to a first multiple access scheme and receiving the message retransmitted by the UE 102 according to a second multiple access scheme.

Figure 9:
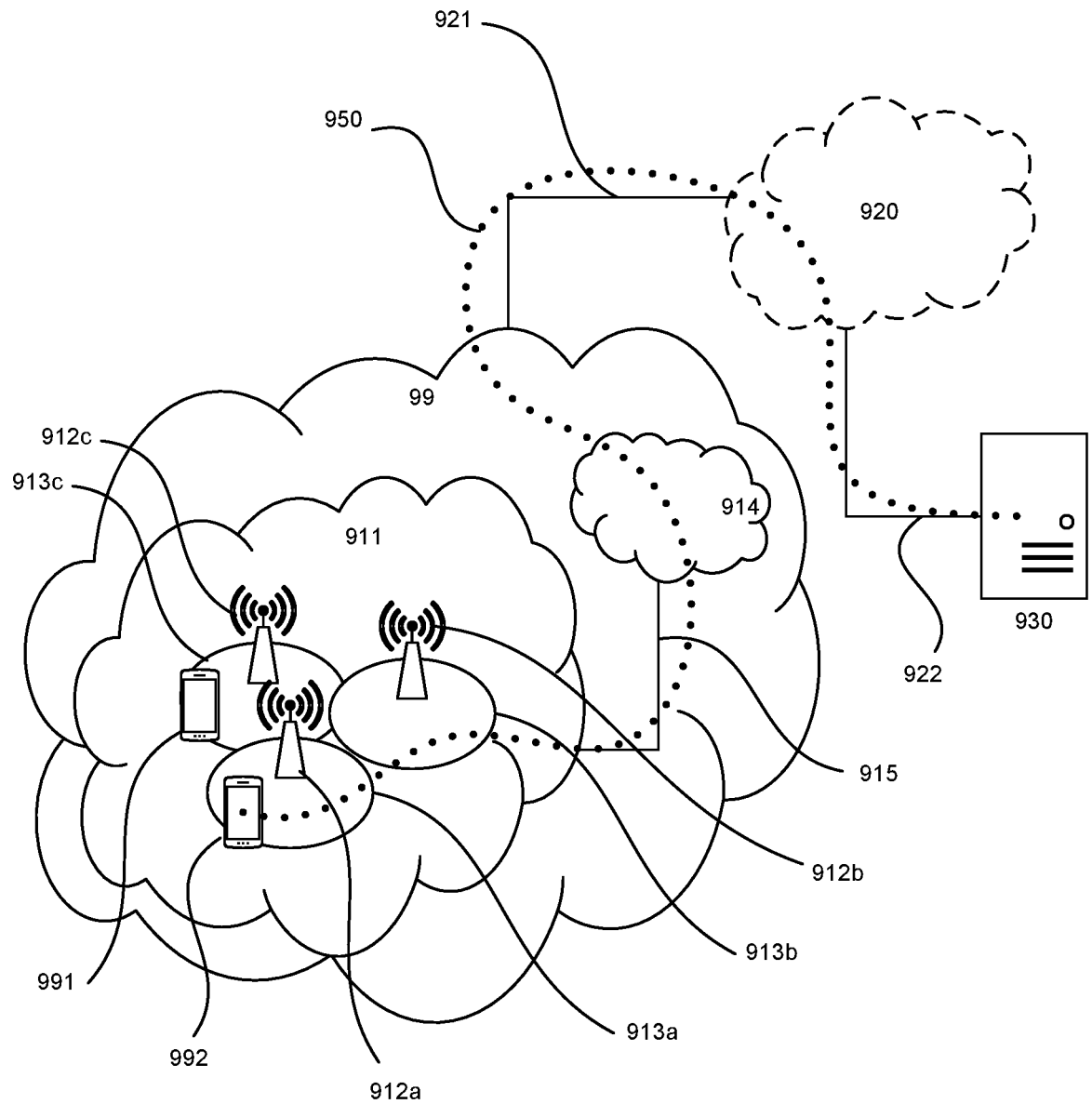
FIG. 9 schematically illustrates a telecommunication network connected via an intermediate network to a host computer.

FIG. 9 illustrates a telecommunication network connected via an intermediate network to a host computer in accordance with some embodiments. With reference to FIG. 9, in accordance with an embodiment, a communication system includes telecommunication network 910, such as a 3GPP-type cellular network, which comprises access network 911, such as a radio access network, and core network 914. Access network 911 comprises a plurality of APs (hereafter base stations) 912a, 912b, 912c, such as NBs, eNBs, gNBs or other types of wireless access points, each defining a corresponding coverage area 913a, 913b, 913c. Each base station 912a, 912b, 912c is connectable to core network 914 over a wired or wireless connection 915. A first UE 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

Telecommunication network 910 is itself connected to host computer 930, which may be embodied in the hardware and/or software of a standalone server, a cloud-implemented server, a distributed server or as processing resources in a server farm. Host computer 930 may be under the ownership or control of a service provider, or may be operated by the service provider or on behalf of the service provider. Connections 921 and 922 between telecommunication network 910 and host computer 930 may extend directly from core network 914 to host computer 930 or may go via an optional intermediate network 920. Intermediate network 920 may be one of, or a combination of more than one of, a public, private or hosted network; intermediate network 920, if any, may be a backbone network or the Internet; in particular, intermediate network 920 may comprise two or more sub-networks (not shown).

The communication system of FIG. 9 as a whole enables connectivity between the connected UEs 991, 992 and host computer 930. The connectivity may be described as an over-the-top (OTT) connection 950. Host computer 930 and the connected UEs 991, 992 are configured to communicate data and/or signaling via OTT connection 950, using access network 911, core network 914, any intermediate network 920 and possible further infrastructure (not shown) as intermediaries. OTT connection 950 may be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10, which illustrates a host computer communicating via a base station with a user equipment over a partially wireless connection in accordance with some embodiments. In communication system 1000, host computer 1010 comprises hardware 1015 including communication interface 1016 configured to set up and maintain a wired or wireless connection with an interface of a different communication device of communication system 1000. Host computer 1010 further comprises processing circuitry 1018, which may have storage and/or processing capabilities. In particular, processing circuitry 1018 may comprise one or more programmable processors, application-specific integrated circuits, field programmable gate arrays or combinations of these (not shown) adapted to execute instructions. Host computer 1010 further comprises software 1011, which is stored in or accessible by host computer 1010 and executable by processing circuitry 1018. Software 1011 includes host application 1012. Host application 1012 may be operable to provide a service to a remote user, such as UE 1030 connecting via OTT connection 1050 terminating at UE 1030 and host computer 1010. In providing the service to the remote user, host application 1012 may provide user data which is transmitted using OTT connection 1050.

Communication system 1000 further includes base station 1020 provided in a telecommunication system and comprising hardware 1025 enabling it to communicate with host computer 1010 and with UE 1030. Hardware 1025 may include communication interface 1026 for setting up and maintaining a wired or wireless connection with an interface of a different communication device of communication system 1000, as well as radio interface 1027 for setting up and maintaining at least wireless connection 1070 with UE 1030 located in a coverage area (not shown in FIG. 10) served by base station 1020. Communication interface 1026 may be configured to facilitate connection 1060 to host computer 1010. Connection 1060 may be direct or it may pass through a core network (not shown in FIG. 10) of the telecommunication system and/or through one or more intermediate networks outside the telecommunication system. In the embodiment shown, hardware 1025 of base station 1020 further includes processing circuitry 1028, which may comprise one or more programmable processors, application-specific integrated circuits, field programmable gate arrays or combinations of these (not shown) adapted to execute instructions. Base station 1020 further has software 1021 stored internally or accessible via an external connection.

Communication system 1000 further includes UE 1030 already referred to. Its hardware 1035 may include radio interface 1037 configured to set up and maintain wireless connection 1070 with a base station serving a coverage area in which UE 1030 is currently located. Hardware 1035 of UE 1030 further includes processing circuitry 1038, which may comprise one or more programmable processors, application-specific integrated circuits, field programmable gate arrays or combinations of these (not shown) adapted to execute instructions. UE 1030 further comprises software 1031, which is stored in or accessible by UE 1030 and executable by processing circuitry 1038. Software 1031 includes client application 1032. Client application 1032 may be operable to provide a service to a human or non-human user via UE 1030, with the support of host computer 1010. In host computer 1010, an executing host application 1012 may communicate with the executing client application 1032 via OTT connection 1050 terminating at UE 1030 and host computer 1010. In providing the service to the user, client application 1032 may receive request data from host application 1012 and provide user data in response to the request data. OTT connection 1050 may transfer both the request data and the user data. Client application 1032 may interact with the user to generate the user data that it provides.

Figure 10:
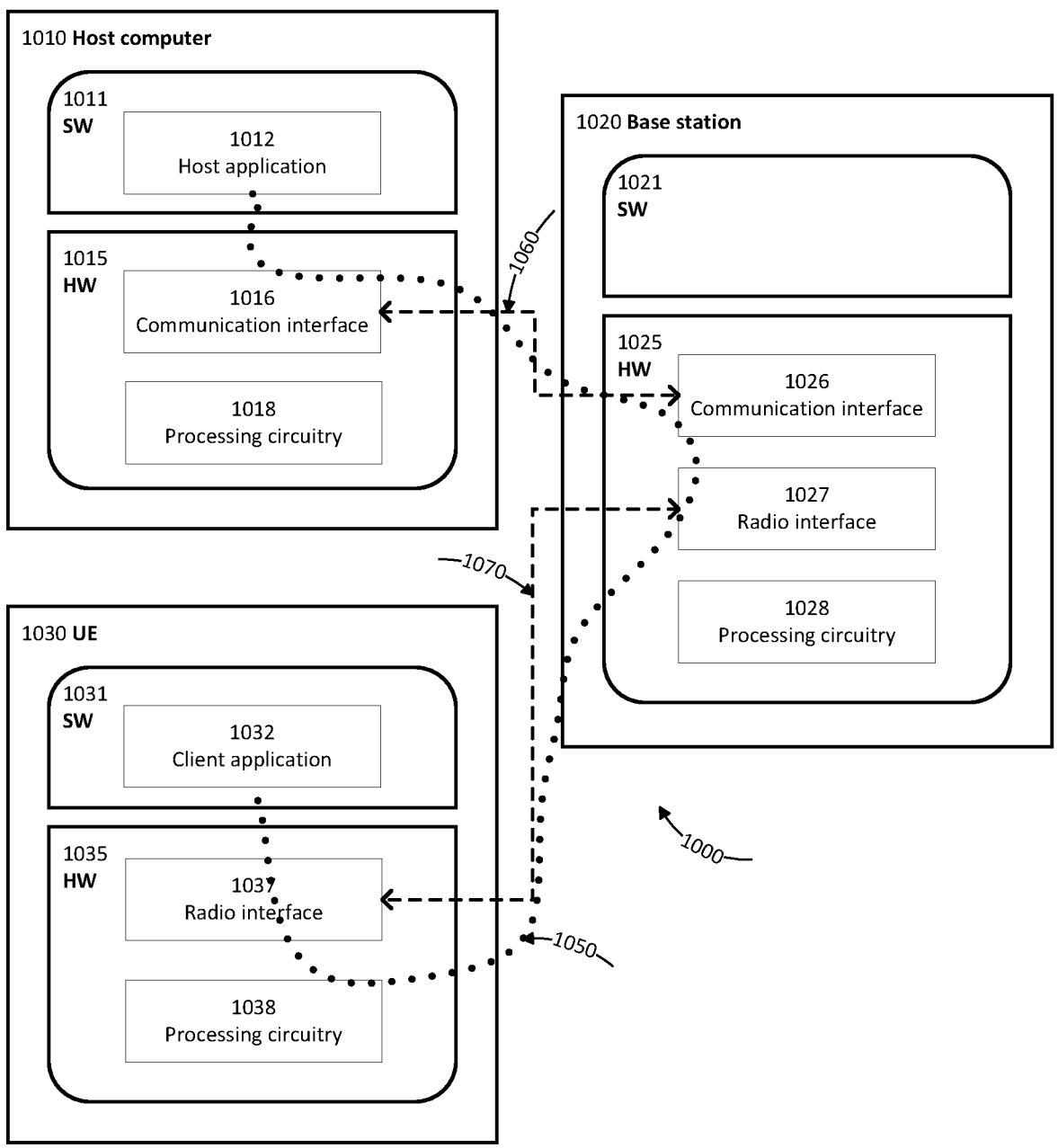
FIG. 10 is a generalized block diagram of a host computer communicating via a base station with a user equipment over a partially wireless connection.

It is noted that host computer 1010, base station 1020 and UE 1030 illustrated in FIG. 10 may be similar or identical to host computer 930, one of base stations 912*a*, 912*b*, 912*c* and one of UEs 991, 992 of FIG. 9, respectively. This is to say, the inner workings of these entities may be as shown in FIG. 10 and independently, the surrounding network topology may be that of FIG. 9.

In FIG. 10, OTT connection 1050 has been drawn abstractly to illustrate the communication between host computer 1010 and UE 1030 via base station 1020, without explicit reference to any intermediary devices and the precise routing of messages via these devices. Network infrastructure may determine the routing, which it may be configured to hide from UE 1030 or from the service provider operating host computer 1010, or both. While OTT connection 1050 is active, the network infrastructure may further take decisions by which it dynamically changes the routing (e.g., on the basis of load balancing consideration or reconfiguration of the network).

Wireless connection 1070 between UE 1030 and base station 1020 is in accordance with the teachings of the embodiments described throughout this disclosure. One or more of the various embodiments improve the performance of OTT services provided to UE 1030 using OTT connection 1050, in which wireless connection 1070 forms the last segment. More precisely, the teachings of these embodiments may improve one or more of the data rate, latency, block error ratio (BLER), overhead, and power consumption and thereby provide benefits such as reduced user waiting time, better responsiveness, extended battery lifetime, etc.

A measurement procedure may be provided for the purpose of monitoring data rate, latency and other factors on which the one or more embodiments improve. There may further be an optional network functionality for reconfiguring OTT connection 1050 between host computer 1010 and UE 1030, in response to variations in the measurement results. The measurement procedure and/or the network functionality for reconfiguring OTT connection 1050 may be implemented in software 1011 and hardware 1015 of host computer 1010 or in software 1031 and hardware 1035 of UE 1030, or both. In embodiments, sensors (not shown) may be deployed in or in association with communication devices through which OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of OTT connection 1050 may include message format, retransmission settings, preferred routing etc.; the reconfiguring need not affect base station 1020, and it may be unknown or imperceptible to base station 1020. Such procedures and functionalities may be known and practiced in the art. In certain embodiments, measurements may involve proprietary UE signaling facilitating host computer 1010's measurements of throughput, propagation times, latency and the like. The measurements may be implemented in that software 1011 and 1031 causes messages to be transmitted, in particular empty or 'dummy' messages, using OTT connection 1050 while it monitors propagation times, errors etc.

Figure 11:
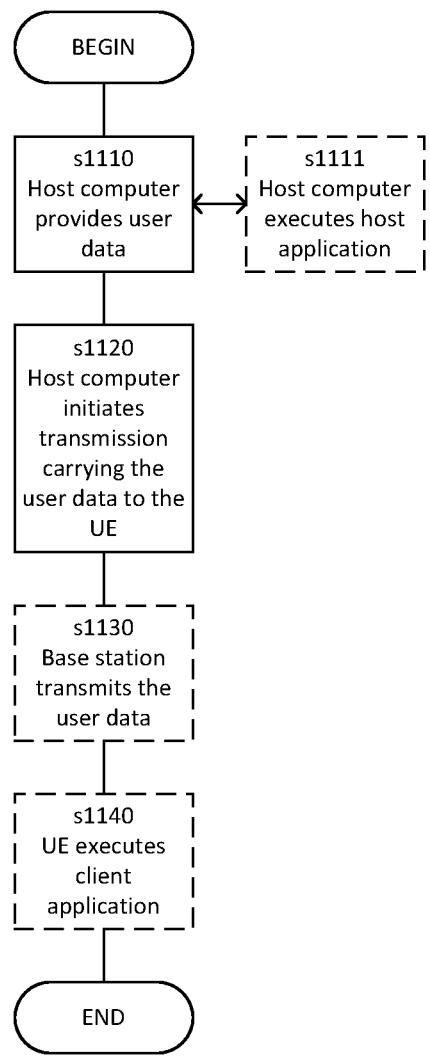
FIG. 11 is a flowchart illustrating a method implemented in a communication system including a host computer, a base station and a user equipment.

FIG. 11 is a flowchart illustrating a method implemented in a communication system, in accordance with one embodiment. The communication system includes a host computer, a base station and a UE which may be those described with reference to FIG. 9 and FIG. 10. In step S1110, the host computer provides user data. In substep S1111 (which may be optional) of step S1110, the host computer provides the user data by executing a host application. In step S1120, the host computer initiates a transmission carrying the user data to the UE. In step S1130 (which may be optional), the base station transmits to the UE the user data which was carried in the transmission that the host computer initiated, in accordance with the teachings of the embodiments described throughout this disclosure. In step S1140 (which may also be optional), the UE executes a client application associated with the host application executed by the host computer.

Figure 12:
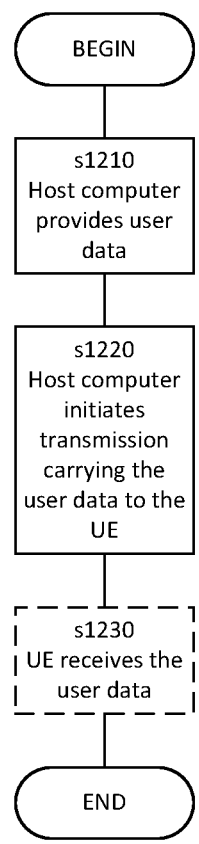
FIG. 12 is a flowchart illustrating a method implemented in a communication system including a host computer, a base station and a user equipment.

FIG. 12 is a flowchart illustrating a method implemented in a communication system, in accordance with one embodiment. The communication system includes a host computer, a base station and a UE which may be those described with reference to FIG. 9 and FIG. 10. For simplicity of the present disclosure, only drawing references to FIG. 12 will be included in this section. In step S1210 of the method, the host computer provides user data. In an optional substep (not shown) the host computer provides the user data by executing a host application. In step S1220, the host computer initiates a transmission carrying the user data to the UE. The transmission may pass via the base station, in accordance with the teachings of the embodiments described throughout this disclosure. In step S1230 (which may be optional), the UE receives the user data carried in the transmission.

Figure 13:
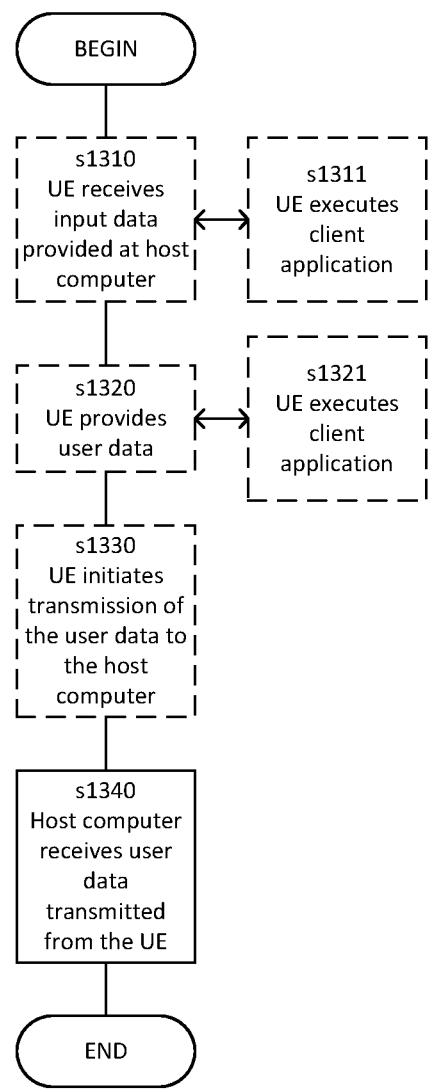
FIG. 13 is a flowchart illustrating a method implemented in a communication system including a host computer, a base station and a user equipment.

FIG. 13 is a flowchart illustrating a method implemented in a communication system, in accordance with one embodiment. The communication system includes a host computer, a base station and a UE which may be those described with reference to FIG. 9 and FIG. 10. For simplicity of the present disclosure, only drawing references to FIG. 13 will be included in this section. In step S1310 (which may be optional), the UE receives input data provided by the host computer. Additionally or alternatively, in step S1320, the UE provides user data. In substep S1321 (which may be optional) of step S1320, the UE provides the user data by executing a client application. In substep S1311 (which may be optional) of step S1310, the UE executes a client application which provides the user data in reaction to the received input data provided by the host computer. In providing the user data, the executed client application may further consider user input received from the user. Regardless of the specific manner in which the user data was provided, the UE initiates, in substep 51330 (which may be optional), transmission of the user data to the host computer. In step S1340 of the method, the host computer receives the user data transmitted from the UE, in accordance with the teachings of the embodiments described throughout this disclosure.

Figure 14:
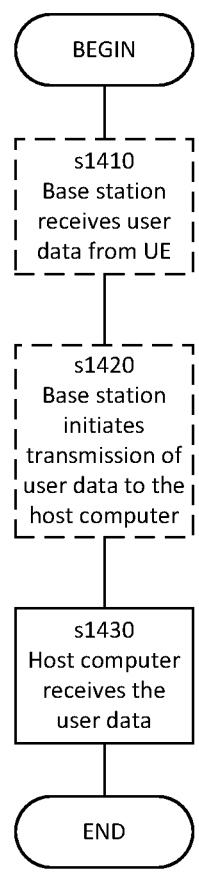
FIG. 14 is a flowchart illustrating a method implemented in a communication system including a host computer, a base station and a user equipment.

FIG. 14 is a flowchart illustrating a method implemented in a communication system, in accordance with one embodiment. The communication system includes a host computer, a base station and a UE which may be those described with reference to FIG. 9 and FIG. 10. For simplicity of the present disclosure, only drawing references to FIG. 14 will be included in this section. In step S1410 (which may be optional), in accordance with the teachings of the embodiments described throughout this disclosure, the base station receives user data from the UE. In step S1420 (which may be optional), the base station initiates transmission of the received user data to the host computer. In step S1430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for transmitting messages, the method comprising:
a user equipment (UE) transmitting a message according to a first multiple access scheme, wherein transmitting the message according to the first multiple access scheme comprises transmitting the message during a first time slot;
the UE retransmitting the message according to a second multiple access scheme, wherein retransmitting the message according to the second multiple access scheme comprises using a first set of frequencies to transmit the message during a second time slot or using a second set of frequencies to transmit the message during the second time slot; and
the UE receiving a first index indicating the first set of frequencies and a second index indicating the second set of frequencies.

2. The method of claim 1, further comprising:
The UE receiving a negative acknowledgement (NACK) transmitted by an access point (AP), the NACK indicating that the AP was unable to decode the message; and
after receiving the NACK, the UE retransmitting the message according to the second multiple access scheme.

3. The method of claim 2, wherein the NACK comprises an indication indicating that the second multiple access scheme should be one of: an OMA scheme and a NOMA scheme.

4. The method of claim 1, wherein the first multiple access scheme is an orthogonal multiple access (OMA) scheme and the second multiple access scheme is a non-orthogonal multiple access (NOMA) scheme.

5. The method of claim 1, further comprising:
before retransmitting the message, receiving synchronization information; and
using the synchronization information to determine a time at which to perform the step of retransmitting the message.

6. A method performed by an access point (AP), the method comprising:
receiving a message transmitted by a user equipment (UE) according to a first multiple access scheme, wherein receiving the message transmitted by the UE according to the first multiple access scheme comprises receiving the message during a first time slot; and
receiving the message retransmitted by the UE according to a second multiple access scheme; and
transmitting a first index indicating a first set of frequencies and a second index indicating a second set of frequencies,
wherein receiving the message retransmitted by the UE according to the second multiple access scheme comprises using the first set of frequencies to receive the message during the second time slot or using the second set of frequencies to receive the message during the second time slot.

7. The method of claim 6, further comprising:
transmitting a negative acknowledgement (NACK) to the UE, the NACK indicating that the AP was unable to decode the message; and
after transmitting the NACK, receiving the message retransmitted by the UE according to the second multiple access scheme.

8. The method of claim 7, wherein the NACK comprises an indication indicating that the second multiple access scheme should be one of: an OMA scheme and a NOMA scheme.

9. The method of claim 6, wherein the first multiple access scheme is an orthogonal multiple access (OMA) scheme and the second multiple access scheme is a non-orthogonal multiple access (NOMA) scheme.

10. The method of claim 6, further comprising:
after receiving the message transmitted by the UE according to the first multiple access scheme, transmitting synchronization information, wherein the UE is configured to use the synchronization information to determine a time at which to perform the step of retransmitting the message.

11. The method of claim 6, further comprising:
storing a first copy of the message received during the first time slot;
storing a second copy of the message received using the first set of frequencies during the second time slot; and
storing a third copy of the message received using the second set of frequencies during the second time slot.

12. The method of claim 11, further comprising:
decoding the message based on a combination of at least one or more of the stored first, second, and third copy of the message.

13. A user equipment (UE) comprising:
a receiver;
a transmitter;
a data storage system; and
data processing circuitry coupled to the data storage system, the transmitter, and the receiver, wherein the data processing circuitry is configured to:
transmit a message according to a first multiple access scheme, wherein transmitting the message according to the first multiple access scheme comprises transmitting the message during a first time slot,
retransmit the message according to a second multiple access scheme, wherein retransmitting the message according to the second multiple access scheme comprises using a first set of frequencies to transmit the message during a second time slot or using a second set of frequencies to transmit the message during the second time slot, and
receive a first index indicating the first set of frequencies and a second index indicating the second set of frequencies.

14. The UE of claim 13, wherein the data processing circuitry is further configured to:
receive a negative acknowledgement (NACK) transmitted by an access point (AP), the NACK indicating that the AP was unable to decode the message; and
after receiving the NACK, retransmit the message according to the second multiple access scheme.

15. The UE of claim 13, wherein the first multiple access scheme is an orthogonal multiple access (OMA) scheme and the second multiple access scheme is a non-orthogonal multiple access (NOMA) scheme.

16. An access point (AP), the AP comprising:
a receiver;
a transmitter;
a data storage system; and
data processing circuitry coupled to the data storage system, the transmitter, and the receiver, wherein the data processing circuitry is configured to:
receive a message transmitted by a user equipment (UE) according to a first multiple access scheme, wherein receiving the message transmitted by the UE according to the first multiple access scheme comprises receiving the message during a first time slot,
receive the message retransmitted by the UE according to a second multiple access scheme, and
transmit a first index indicating a first set of frequencies and a second index indicating a second set of frequencies,
wherein receiving the message retransmitted by the UE according to the second multiple access scheme comprises using the first set of frequencies to receive the message during the second time slot or using the second set of frequencies to receive the message during the second time slot.

17. The AP of claim 16, wherein the data processing circuitry is further configured to:
transmit a negative acknowledgement (NACK) to the UE, the NACK indicating that the AP was unable to decode the message; and
after transmitting the NACK, receive the message retransmitted by the UE according to the second multiple access scheme.

18. The AP of claim 16, wherein the first multiple access scheme is an orthogonal multiple access (OMA) scheme and the second multiple access scheme is a non-orthogonal multiple access (NOMA) scheme.

19. A computer program product comprising a non-transitory computer readable medium storing a computer program for transmitting messages, the computer program comprising computer readable instructions which, when run on a user equipment (UE), causes the UE to perform the method of claim 1.

20. A computer program product comprising a non-transitory computer readable medium storing a computer program, the computer program comprising computer readable instructions which, when run on an access point (AP), causes the AP to perform the method of claim 6.

* * * * *